No. 823,185. PATENTED JUNE 12, 1906.
R. MILLER, Jr.
AIR VALVE FOR GAS ENGINES.
APPLICATION FILED JAN. 27, 1905.

WITNESSES

INVENTOR
REUBEN MILLER, JR.
BY James Whittemore
ATTY.

UNITED STATES PATENT OFFICE.

REUBEN MILLER, JR., OF PITTSBURG, PENNSYLVANIA, ASSIGNOR OF ONE-HALF TO D. W. DUNLEVY, OF PITTSBURG, PENNSYLVANIA.

AIR-VALVE FOR GAS-ENGINES.

No. 823,185. Specification of Letters Patent. Patented June 12, 1906.

Application filed January 27, 1905. Serial No. 242,945.

*To all whom it may concern:*

Be it known that I, REUBEN MILLER, Jr., residing at Pittsburg, in the county of Allegheny and State of Pennsylvania, a citizen of the United States, have invented certain new and useful Improvements in Air-Valves for Explosive-Engines, of which the following is a specification, reference being had therein to the accompanying drawings.

My invention consists in an automatic air-valve for explosive-engines, and particularly in the construction and combination of parts, as will be more fully hereinafter described, and pointed out in the claims.

The cheaper forms of gas-engines are not, as a rule, provided with carbureters which are self-regulating for all speeds; and the object of my invention is to provide an automatic air-valve which may be constructed at small expense and may be attached to any gas-engine to remedy this defect.

Figure 1:
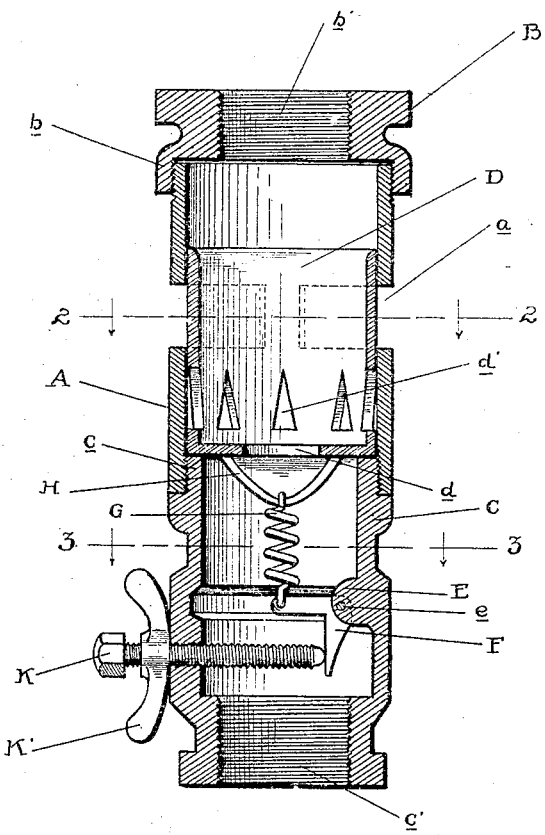
Figure 2:
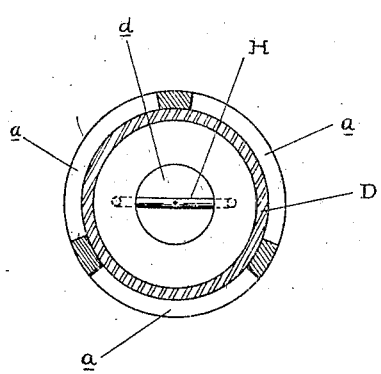
Figure 3:
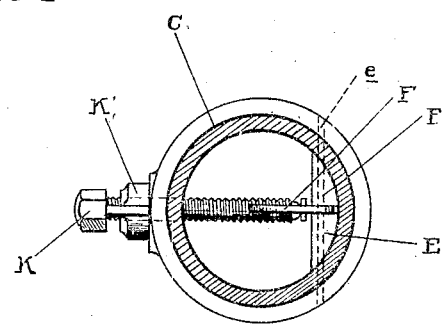

In the drawings, Figure 1 shows a vertical cross-section through the valve. Fig. 2 is a horizontal cross-section of the same on the line 2 2 of Fig. 1. Fig. 3 is a horizontal cross-section on the line 3 3 of Fig. 1.

A represents a tubular member, preferably of brass, which is exteriorly threaded at one end to receive the threaded annular flange $b$ of the casting B, which is threaded interiorly at $b'$ to receive a pipe (not shown) leading to the engine. At its other end the member A is interiorly threaded to receive the flange $c$ of the tubular end casting C, and at an intermediate point in the member A are the rectangular radial ports $a$.

The members A and C form the casing of the valve, and on the shoulder formed by the flange $c$ rests the piston D, which has the axial circular port $d$ and the radial triangular ports $d'$. When the piston is in its normal position, the ports $d'$ are not in registration with the ports $a$; but when the piston is sufficiently moved the ports will register.

The tubular end casting C has at its other end the interiorly-threaded portion $c'$ to fit the pipe, (not shown,) connecting it with the carbureter.

At an intermediate point in the casting C, I provide the segmental shoulders E E, between which the bell-crank lever F is pivoted for motion in a vertical plane by means of the pin $e$. Opposite the shoulders E E, I preferably channel out the casting, so that the shoulders will not constrict the air-passage. The spiral spring G, attached to one arm of this lever, connects it to the yoke H on the piston and tends to hold said piston on the flange $c$.

Through an aperture in the wall of the casting is screwed the pin K. This pin engages the free end of the bell-crank lever F and tends to prevent the upward movement of the same. Thus the adjustment of the pin K regulates the tension of the spring G. The pin K may be locked in any required position by the wing-nut K', acting as a jam-nut, or any other suitable means.

The operation of my invention is as follows: The end B is connected to the engine and the end C to the carbureter by suitable pipes. In the cheaper forms of gas-engines the carbureters are usually adjustable by the operator, and as more suction is created where the engine speeds and more of the fluid is drawn out the amount of air must be correspondingly increased by the operator or the gas will be too rich to be exploded.

In my invention this difficulty is obviated by providing the port $d$, which is of a constant area sufficient for the suction when the engine is running at normal speed, and the auxiliary air-ports. The spring is adjusted by the pin K, so that when the engine speeds the increased suction will raise the piston until a sufficient area of the ports $a$ and $d'$ are in registration to let in sufficient atmospheric air to keep the quality of the gas constant and insure proper ignition.

The importance of having the ports $d'$ triangular in form lies in the fact that the tension of the spring is not constant for all positions of the piston. As the spring is extended its tension increases, and therefore the amount of force necessary to lift the piston increases disproportionately to the increase of suction. The triangular ports obviate this difficulty by increasing the area of registration disproportionately to the increase of lift of the piston. I do not wish to limit my invention to triangular ports, for it is obvious that I may employ semicylindrical ports or, in fact, any other form which will produce this effect, without departing from the spirit of my invention.

A further advantage lies in the use of my invention in diluting the mixture after it has passed from the carbureter. An engine starts better if the mixture is made richer than its expedient for fast running. Then when the engine speeds up the supplementary air-ports open, and on account of the spacing of these ports the mixture is not only made perfect in richness, but is so stirred up by the inrush of this additional air that it reaches the engine perfectly mixed for each explosion and constant for any speed of the engine.

What I claim as my invention is—

1. In an automatic valve, the combination with a radially-apertured casing, of a radially and axially apertured piston therein, the radial apertures of said casing and piston being adapted to register on movement of said piston, a yielding member having its respective ends secured to said piston and to one arm of a bell-crank lever pivoted in said casing, and adjusting means operably connected to the other arm of said lever, for the purpose described.

2. In an automatic air-valve, the combination with a casing, of a reciprocatory piston therein, a yielding member secured to said piston and tending to prevent movement thereof, a bell-crank lever pivoted in said casing and having one arm secured to the free end of said yielding member, and adjusting means acting upon the other arm, for the purpose described.

3. In an automatic valve, the combination with a casing having the apertures a, the lever F, adjusting means K, spring G, and piston D having tapering apertures d', for the purpose described.

4. In an automatic air-valve the combination with a radially-apertured tubular member arranged in the gas-conduit of an engine, of a piston therein having radial apertures, said piston having a restricted axial aperture and being arranged to be moved by differential pressures of gas upon its ends to cause a registration of its radial apertures with those of said tubular member, for the purpose described.

5. In an automatic air-valve, the combination with a casing having its sides apertured, of a piston therein arranged to be moved by differential pressures of gas acting upon its opposite ends, and a yielding member tending to prevent said movement, said piston having apertures in its sides adapted to register with the apertures in said casing, the area of said registration being in substantially constant ratio with the difference in pressure acting upon said piston.

6. In an automatic air-valve, the combination with a casing having its sides apertured, of a piston therein arranged to be moved by differential pressures of gas acting upon its opposite ends, and a yielding member tending to prevent said movement, said piston having apertures in its sides adapted to register with the apertures in said casing, the area of said registration increasing disproportionately to the increase of distance of movement of said piston, whereby the inconstant tension of said yielding member is substantially neutralized.

In testimony whereof I affix my signature in presence of two witnesses.

REUBEN MILLER, Jr.

Witnesses:
D. W. DUNLEVY,
F. MORRIS.